Jan. 20, 1953  J. E. SAMPSON  2,625,725
PIN FASTENER
Filed Oct. 16, 1950

INVENTOR.
JULIAN E. SAMPSON
BY
ATTORNEY.

Patented Jan. 20, 1953

2,625,725

UNITED STATES PATENT OFFICE 2,625,725

PIN FASTENER

Julian E. Sampson, St. Louis, Mo.

Application October 16, 1950, Serial No. 190,385

1 Claim. (Cl. 24—160)

This invention relates to safety fasteners for holding fabric articles together. An object of my invention is to provide a device using pins for piercing the fabric which is so constructed as to shield the pinpoints whether in open or closed position.

A further object of my invention is to provide a pin fastener in which the pins pierce the fabric at substantially right angles to the plane of the fabric.

A further object of my invention is to provide a pin fastener having a recess for receiving folded fabric before being pierced with the pins.

A further object of my invention is to provide a pin fastener having a broad base for contact with the fabric or with the body of the wearer for resisting displacement.

In general my invention is an improvement on safety pins in that its pin points are always shielded and a plurality of pins are incorporated in each safety fastener.

A further object of my invention is to provide a pin fastener that is so safe that it may be employed immediately adjacent the body of the wearer.

These and such other objects of my invention as may hereinafter appear will be best understood from a description of the embodiments thereof shown in the accompanying drawings in which.

My pin fastener comprises a U-shaped base member indicated at 10 and a lever member, indicated at 11, hinged to the base member at 12.

Figure 1:
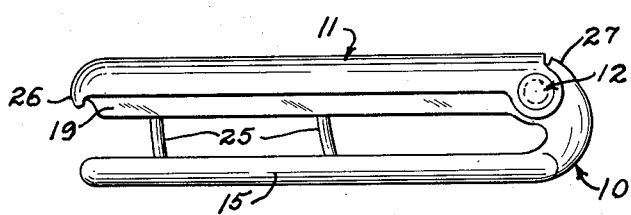
Fig. 1 is a side elevation of my pin fastener in closed position.
Figure 2:
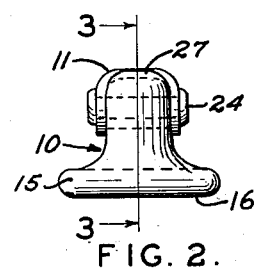
Fig. 2 is an end view of the pin fastener.
Figure 3:
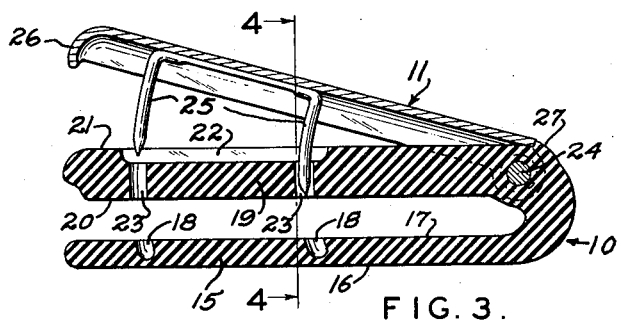
Fig. 3 is a sectional view taken substantially on line 3—3 in Fig. 2 and with the pin fastener in open position.
Figure 4:
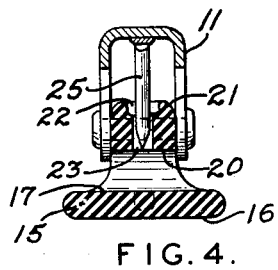
Fig. 4 is a cross sectional view taken substantially on line 4—4 in Fig. 3.
Figure 5:
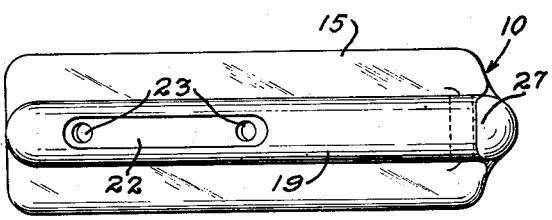
Fig. 5 is a plan view pin fastener base member.

Base member 10 may be formed of sheet metal or may be cast solid of a resinous material such as plastics as indicated in Fig. 3.

Base member 10 is U-shaped for receiving fabric or other sheet material to be fastened together. The lower arm 15 is of substantial width to form a base for the device and has a smooth under surface 16 and an upper surface 17 provided with sockets 18 for receiving the pin points to be described hereinafter.

The upper arm 19 of member 10 is substantially parallel to arm 15 and functions as a guide and shield member for the pins. Arm 19 is constructed with a flat under surface 20 and a rounded upper surface 21. A recess 22 is provided in the upper surface 21 and guide apertures 23 extending from recess 22 through the flat under surface 20 are for receiving the pin structure.

The lever member 11 is preferably of sheet metal formed to snugly encase the upper portion of arm 19 and is hinged to the base member 10 by rivet 24. Pin members 25 are attached to the under side of lever member 11 by any suitable means such as spot welding and are so shaped and positioned that they pass through apertures 23 when the lever is swung about its pivot, and their extremities or points are received in sockets 18 when lever 11 is in closed position. The outer end 26 of lever 11 is cupped to form a resilient means for snapping over a shoulder on the outer end of arm 19 to hold the lever 11 in closed position.

A boss 27 is formed on base member 10 as a stop to limit outward movement by engagement of the end of lever 11 so that the points of the pins 25 will not be withdrawn from arm 19 when lever 11 is in open position.

A plurality of folds or layers of sheet material such as a baby's diaper or a bandage may readily be fastened with my safety pin fastener by first positioning the material between the arms 15 and 19. With slight pressure on lever 11 the pin members 25 will pierce the material and the pin points will enter the sockets 18 as the cupped end 26 of lever 11 is snapped over the end of arm 19. Pulling or twisting of the material will not tend to open my safety fastener as the pressure would be exerted at right angle to the pins.

The base member of my fastener presents a large smooth bearing surface which distributes the pressure exerted in snapping lever 11 into closed position.

It is understood that my invention is not limited to the specific embodiment shown and described and various deviations may be made therefrom without departing from the spirit of the invention.

I claim:

In a pin fastener, a U-shaped member having a pair of arms spaced apart for receiving material which is to be fastened, one arm of said U-shaped member being relatively wide and having flat inner and outer surfaces and rounded longitudinal edge portions, the other arm of said U-shaped member being relatively narrow in width and overlying the first arm medially thereof and throughout its length and terminating at its outer end in a downwardly facing shoulder, the outer upper longitudinal face of the narrow arm being reduced in vertical height from an upwardly extending boss at its inner end and throughout its length, arcuate openings in said arms lying in parallel arcs, the arm connecting portion of said U-shaped member converging upwardly from the first arm and merging with the second arm, a pivot pin opening formed in the narrow arm at its junction with the connecting portion, a pivot pin in said opening, a lever of relatively thin material and U-shaped in cross section mounted on said pin and adapted to seat on the top reduced surface of the relatively narrow arm when in closed position, said lever terminating in an end hook portion for engagement with the end shoulder of said arm to secure the parts against separation, and pin members of arcuate form carried by said lever and adapted to operate through said arcuate openings.

JULIAN E. SAMPSON.

REFERENCES CITED

The following references are of record in the file of this patent:

UNITED STATES PATENTS

| Number | Name | Date |
| --- | --- | --- |
| 479,938 | Fredlihp | Aug. 2, 1892 |
| 897,976 | Germann | Sept. 8, 1908 |
| 1,371,593 | Ahlmgren | Mar. 15, 1921 |
| 1,742,989 | Fritz | Jan. 7, 1930 |
| 2,057,006 | Caccamise | Oct. 13, 1936 |
| 2,380,430 | Hallock | July 31, 1945 |